US009190861B2

(12) United States Patent
Kim et al.

(10) Patent No.: US 9,190,861 B2
(45) Date of Patent: Nov. 17, 2015

(54) BATTERY PACK AND METHOD OF CONTROLLING THE SAME

(71) Applicant: Samsung SDI Co., Ltd., Yongin-si, Gyeonggi-do (KR)

(72) Inventors: Hyun Kim, Yongin-si (KR); Ri-A Ju, Yongin-si (KR); Ji-Hong Lim, Yongin-si (KR); Suk-Kyum Kim, Yongin-si (KR); Seong-Joon Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 325 days.

(21) Appl. No.: 13/745,479

(22) Filed: Jan. 18, 2013

(65) Prior Publication Data

US 2013/0249219 A1    Sep. 26, 2013

(30) Foreign Application Priority Data

Mar. 23, 2012    (KR) .......................... 10-2012-0030237

(51) Int. Cl.
*H02J 7/00* (2006.01)
*F02N 11/04* (2006.01)
(Continued)

(52) U.S. Cl.
CPC .............. *H02J 7/007* (2013.01); *B60L 11/126* (2013.01); *B60L 11/1853* (2013.01); *F02N 11/04* (2013.01); *F02N 11/0866* (2013.01); *H01M 10/441* (2013.01); *H02J 1/06* (2013.01); *H02J 7/0019* (2013.01); *B60L 2240/547* (2013.01); *B60L 2240/549* (2013.01); *F02N 11/087* (2013.01); *Y02T 10/6217* (2013.01); *Y02T 10/705* (2013.01); *Y02T 10/7005* (2013.01);
(Continued)

(58) Field of Classification Search
CPC ............ Y02T 10/7038; Y02T 10/7044; Y02T 10/7055; Y02T 10/7066; Y02T 10/72; Y02T 10/92
USPC .......................... 320/104, 126–128, 132–137
See application file for complete search history.

(56) References Cited

U.S. PATENT DOCUMENTS 5,796,224 A * 8/1998 Hayashi et al. ................ 318/139
5,883,496 A * 3/1999 Esaki et al. ..................... 320/132
(Continued)

FOREIGN PATENT DOCUMENTS

JP    2005-287146 A    10/2005
JP    2008236848 A1    10/2008
(Continued)

OTHER PUBLICATIONS

Korean Office Action issued by KIPO on Apr. 30, 2013 in corresponding Korean Patent Application No. 10-2012-0030237 with English translation.
(Continued)

*Primary Examiner* — Stacy Whitmore
(74) *Attorney, Agent, or Firm* — Robert E. Bushnell, Esq.

(57) ABSTRACT

One embodiment of the present invention relates to a battery pack and a method of controlling the battery pack, and more particularly, to a battery pack receiving a charging current from a power generation module and a method of controlling the battery pack. In the battery pack, when an output voltage of the power generation module is higher than a rated voltage of a main battery and a rated voltage of a sub-battery is higher than the rated voltage of the main battery, an energy loss may be reduced.

17 Claims, 6 Drawing Sheets

(51) Int. Cl.
    *H02J 1/06*         (2006.01)
    *H01M 10/44*      (2006.01)
    *B60L 11/12*       (2006.01)
    *B60L 11/18*       (2006.01)
    *F02N 11/08*      (2006.01)

(52) U.S. Cl.
    CPC .......... *Y02T 10/7038* (2013.01); *Y02T 10/7044* (2013.01); *Y02T 10/7055* (2013.01); *Y02T 10/7066* (2013.01); *Y02T 10/7072* (2013.01); *Y02T 10/7077* (2013.01)

(56) References Cited

U.S. PATENT DOCUMENTS

| | | | | |
|---|---|---|---|---|
| 5,977,744 | A * | 11/1999 | Williams et al. | 320/104 |
| 6,249,106 | B1 * | 6/2001 | Turner et al. | 320/136 |
| 6,321,707 | B1 * | 11/2001 | Dunn | 123/179.3 |
| 6,630,810 | B2 * | 10/2003 | Takemasa et al. | 320/104 |
| 6,828,742 | B2 * | 12/2004 | Suzuki et al. | 318/139 |
| 6,828,755 | B1 * | 12/2004 | Iverson et al. | 320/104 |
| 6,844,634 | B2 * | 1/2005 | Kobayashi et al. | 290/40 C |
| 7,267,090 | B2 * | 9/2007 | Tamai et al. | 123/179.3 |
| 7,834,583 | B2 * | 11/2010 | Elder et al. | 320/104 |
| 8,030,880 | B2 * | 10/2011 | Alston et al. | 320/103 |
| 8,125,181 | B2 * | 2/2012 | Gregg et al. | 320/104 |
| 8,423,219 | B2 * | 4/2013 | Tofukuji et al. | 701/22 |
| 8,436,585 | B2 * | 5/2013 | Yano | 320/132 |
| 8,441,228 | B2 * | 5/2013 | Brabec | 320/104 |
| 8,531,053 | B2 * | 9/2013 | Choi et al. | 307/9.1 |
| 2001/0019224 | A1 * | 9/2001 | Amano et al. | 307/10.7 |
| 2004/0026140 | A1 * | 2/2004 | Suzuki et al. | 180/65.2 |
| 2004/0232881 | A1 * | 11/2004 | Amano et al. | 320/104 |
| 2005/0093508 | A1 * | 5/2005 | Taniguchi et al. | 320/104 |
| 2005/0285559 | A1 * | 12/2005 | Siddiqui et al. | 320/103 |
| 2006/0214636 | A1 * | 9/2006 | Arai et al. | 320/116 |
| 2006/0232238 | A1 * | 10/2006 | Horii | 320/104 |
| 2007/0210743 | A1 * | 9/2007 | Tabei et al. | 320/104 |
| 2008/0157721 | A1 * | 7/2008 | Kaneko et al. | 320/136 |
| 2009/0107743 | A1 * | 4/2009 | Alston et al. | 180/65.21 |
| 2009/0127930 | A1 | 5/2009 | Senda | |
| 2010/0066302 | A1 * | 3/2010 | Gregg et al. | 320/104 |
| 2011/0156620 | A1 * | 6/2011 | Yeh | 318/139 |
| 2011/0198920 | A1 | 8/2011 | Komuro et al. | |
| 2012/0032360 | A1 * | 2/2012 | Bland et al. | 261/161 |
| 2012/0112688 | A1 | 5/2012 | Ho | |
| 2012/0212046 | A1 * | 8/2012 | Goto | 307/9.1 |
| 2012/0268058 | A1 * | 10/2012 | Enoki | 320/104 |
| 2013/0106320 | A1 * | 5/2013 | Yugo | 318/139 |
| 2013/0249492 | A1 * | 9/2013 | Kim et al. | 320/128 |
| 2013/0249494 | A1 * | 9/2013 | Ju et al. | 320/134 |
| 2014/0035291 | A1 * | 2/2014 | Gibson et al. | 290/36 R |
| 2014/0055102 | A1 * | 2/2014 | Gibson et al. | 322/7 |
| 2014/0132063 | A1 * | 5/2014 | Kakiuchi et al. | 307/9.1 |
| 2014/0152262 | A1 * | 6/2014 | Nomoto | 320/118 |

FOREIGN PATENT DOCUMENTS

| | | |
|---|---|---|
| JP | 2010063330 A1 | 3/2010 |
| KR | 10-2011-0038975 | 4/2011 |

OTHER PUBLICATIONS

Korean Registration Determination Certificate issued by KIPO on Apr. 30, 2014 in corresponding Korean Patent Application No. 10-2012-0030237 with English translation.

* cited by examiner

BATTERY PACK AND METHOD OF CONTROLLING THE SAME

CLAIM OF PRIORITY

This application makes reference to, incorporates the same herein, and claims all benefits accruing under 35 U.S.C. §119 from an application earlier filed in the Korean Intellectual Property Office on 23 Mar. 2012 and there duly assigned Serial No. 10-2012-0030237.

BACKGROUND OF THE INVENTION

1. Field of the Invention

One embodiment of the present invention relates to a battery pack and a method of controlling the battery pack, and more particularly, to a battery pack receiving a charging current from a power generation module and a method of controlling the battery pack so as to decrease a loss of electric energy that is supplied from the power generation module to the battery pack.

2. Description of the Related Art

In general, unlike a primary battery that cannot be charged and discharged, a secondary battery can be charged and discharged. A secondary battery may be used as an energy source of mobile devices, electric vehicles, hybrid vehicles, electric bicycles, uninterruptible power supplies (UPSs), and the like. In accordance with the type of an external device using a secondary battery, a secondary battery may be used in the form of a single battery or in the form of a battery module formed by grouping a plurality of secondary batteries.

A lead-acid battery may be used as a power supply device to start an engine. Recently, in order to improve fuel efficiency, an idle stop & go (ISG) system is used and has become widespread. Regardless of a high output characteristic of an engine startup and a high frequency of the engine startup attempts, a power supply device that supports an ISG system, that is, an engine idling prevention system, must well maintain its charging and discharging characteristics and have a guaranteed lifetime. Due to frequent and repetitive engine stop and re-startup in an ISG system, however, charging and discharging characteristics of an existing lead-acid battery may deteriorate.

SUMMARY OF THE INVENTION

One or more embodiments of the present invention provide a battery pack that receives a charging current from a power generation module, and a method of controlling the battery pack so as to decrease a loss of electric energy that is supplied from the power generation module to the battery pack.

Additional aspects will be set forth in part in the description which follows and, in part, will be apparent from the description, or may be learned by practice of the presented embodiments.

In accordance with one or more embodiments of the present invention, a battery pack includes a main battery for charging an electric energy by receiving a charging current from a power generation module; a sub-battery for charging an electric energy by receiving a charging current from the power generation module; and a battery control unit for controlling a charging current from the power generation module to be delivered to the sub-battery, instead of the main battery, when a voltage of the main battery is equal to or greater than a first reference voltage. An output voltage of the power generation module is higher than a rated voltage of the main battery, and a rated voltage of the sub-battery is higher than the rated voltage of the main battery.

The battery pack may further include a first switch that is serially connected between the power generation module and the main battery; and a second switch that is serially connected between the power generation module and the sub-battery.

When the voltage of the main battery is less than the first reference voltage, the battery control unit may turn on the first switch and may turn off the second switch; when the voltage of the main battery is equal to or greater than the first reference voltage, the battery control unit may turn on the second switch and may turn off the first switch.

The battery pack may further include a sub-battery discharging unit that discharges the sub-battery when a voltage of the sub-battery is equal to or greater than a second reference voltage, and the second reference voltage may correspond to a voltage of the sub-battery when the sub-battery is fully charged.

The battery pack may further include a third switch that is connected between end terminals of the sub-battery. When the voltage of the sub-battery is less than the second reference voltage, the battery control unit may turn off the third switch; when the voltage of the sub-battery is equal to or greater than the second reference voltage, the battery control unit may turn on the third switch.

The battery pack may be included in a transporting means having an engine and may supply a discharging current to a starter motor that provides a driving power for a start-up of the engine of the transporting means, and the power generation module may generate an electric energy from an energy that is supplied from the engine.

The battery pack may further include a third switch that is connected between end terminals of the sub-battery. When the voltage of the sub-battery is less than the second reference voltage, the battery control unit may turn off the third switch; when the voltage of the sub-battery is equal to or greater than the second reference voltage, the battery control unit may turn on the third switch; when the voltage of the sub-battery is greater than a third reference voltage, the battery control unit may turn on the third switch; when the voltage of the sub-battery is equal to or less than the third reference voltage, the battery control unit may turn off the third switch. The second reference voltage corresponds to a voltage of the sub-battery when the sub-battery is fully charged, the third reference voltage corresponds to a voltage of the sub-battery. The voltage is lower than the second reference voltage and corresponds to a charging capacity capable of driving the starter motor once by using the electric energy stored in the sub-battery.

The battery control unit may discharge a discharging current from the main battery and the sub-battery in a discharging mode.

The battery pack may further include a first switch that is serially connected between the power generation module and the main battery; and a second switch that is serially connected between the power generation module and the sub-battery, and the battery control unit may turn on the first switch and the second switch in the discharging mode.

The battery pack may further include a third switch that is connected between end terminals of the sub-battery, and the battery control unit may turn off the third switch in the discharging mode.

In accordance with one or more embodiments of the present invention, a method of controlling a battery pack including a main battery and a sub-battery that charge an electric energy by receiving a charging current from a power generation module includes operations of measuring a voltage of the main battery; and delivering a charging current from the power generation module to the sub-battery, instead of the main battery, when a voltage of the main battery is equal to or greater than a first reference voltage. An output voltage of the power generation module is higher than a rated voltage of the main battery, and a rated voltage of the sub-battery is higher than the rated voltage of the main battery.

The battery pack may further include a first switch that is serially connected between the power generation module and the main battery; and a second switch that is serially connected between the power generation module and the sub-battery. The method may further include operations of turning on the first switch and turning off the second switch when the voltage of the main battery is less than the first reference voltage; and turning on the second switch and turning off the first switch when the voltage of the main battery is equal to or greater than the first reference voltage.

The method may further include an operation of discharging the sub-battery when a voltage of the sub-battery is equal to or greater than a second reference voltage, and the second reference voltage may correspond to a voltage of the sub-battery when the sub-battery is fully charged.

The battery pack may further include a third switch that is connected between end terminals of the sub-battery. The method may further include operations of turning off the third switch when the voltage of the sub-battery is less than the second reference voltage; and turning on the third switch when the voltage of the sub-battery is equal to or greater than the second reference voltage.

The battery pack may be included in a transporting means having an engine and may supply a discharging current to a starter motor that provides a driving power for a start-up of the engine of the transporting means, and the power generation module may generate an electric energy from an energy that is supplied from the engine.

The battery pack may further include a third switch that is connected between end terminals of the sub-battery. The method may further include operations of turning off the third switch when the voltage of the sub-battery is less than the second reference voltage; turning on the third switch when the voltage of the sub-battery is equal to or greater than the second reference voltage; turning on the third switch when the voltage of the sub-battery is greater than a third reference voltage; and turning off the third switch when the voltage of the sub-battery is equal to or less than the third reference voltage. The second reference voltage corresponds to a voltage of the sub-battery when the sub-battery is fully charged, the third reference voltage corresponds to a voltage of the sub-battery, and the voltage is lower than the second reference voltage and corresponds to a charging capacity capable of driving the starter motor once by using the electric energy stored in the sub-battery.

The method may further include an operation of discharging a discharging current from the main battery and the sub-battery in a discharging mode.

The battery pack may further include a first switch that is serially connected between the power generation module and the main battery; and a second switch that is serially connected between the power generation module and the sub-battery, and the method may further include an operation of turning on the first switch and the second switch in the discharging mode.

The battery pack may further include a third switch that is connected between end terminals of the sub-battery. The method may further include an operation of turning off the third switch in the discharging mode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, number, process, operation, component, and/or group thereof, but do not exclude the existence of one or more other recited forms, numbers, processes, operations, components, and/or groups thereof. While terms "first" and "second" are used to describe various components, parts, regions, layers, and/or portions, it is obvious that the components, parts, regions, layers, and/or portions are not limited to the terms "first" and "second". The terms "first" and "second" are used only to distinguish between each of components, parts, regions, layers, and/or portions.

Hereinafter, the present invention will be described in detail by explaining exemplary embodiments of the invention with reference to the attached drawings.

Figure 1:
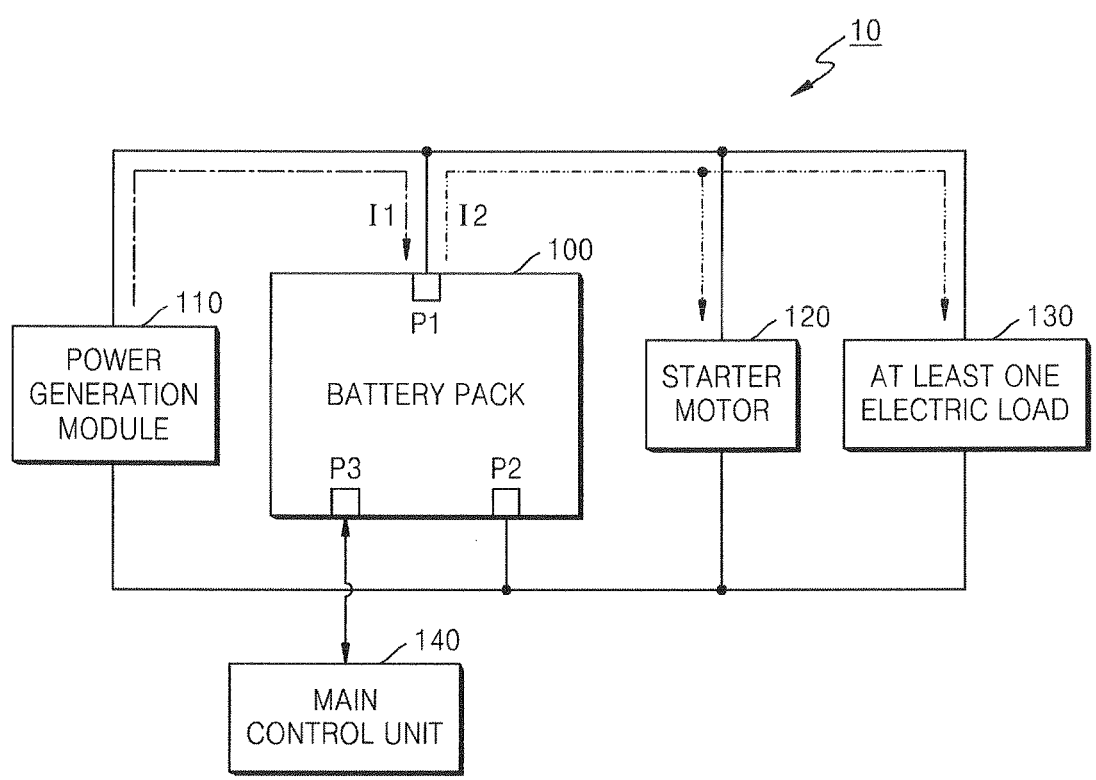
FIG. 1 is a diagram illustrating a structure of a transporting means to which a battery pack constructed with the principle of an embodiment of the present invention is mounted.

FIG. 1 is a diagram illustrating a structure of a transporting means 10 to which a battery pack 100 according to an embodiment of the present invention is mounted. For example, the transporting means 10 may include vehicles, electric bicycles, and the like.

The battery pack 100 may store electric energy by receiving a charging current I1 generated by a power generation module 110, and may supply a discharging current I2 to a starter motor 120. For example, the power generation module 110 may be power-connected to an engine (not shown), and in this regard, the power generation module 110 may be connected to a driving axis of the engine and thus may convert a rotating power into an electrical output. Here, the charging current I1 generated by the power generation module 110 may be supplied to the battery pack 100. For example, the power generation module 110 may include a direct current (DC) power generator (not shown) or an alternating current (AC) generator (not shown), a rectifying device, and the like, and may supply a voltage of about DC 15V, particularly, a voltage between about DC 14.2V and about 14.8V.

For example, the starter motor 120 may be driven in a startup of the engine, and may provide an initial rotating power to rotate the driving axis of the engine. For example, the starter motor 120 may receive a power stored in the battery pack 100 via first and second terminals P1 and P2 of the battery pack 100 and then may start the engine by rotating the driving axis when the engine is started or is re-started after an idle stop. The starter motor 120 is driven in the startup of the engine, and while the engine started by the starter motor 120 is driven, the power generation module 110 is driven to generate the charging current I1.

For example, the battery pack 100 may be used as a power device to start an engine of an idle stop & go (ISG) system having an ISG function so as to improve fuel efficiency. In the ISG system, a stop and a re-startup of the engine are frequently repeated and thus the battery pack 100 is repeatedly charged and discharged.

In a lead-acid battery that is applied to a contemporary ISG system, because charging and discharging operations of the battery are repeated, the durability and lifetime of the battery may be reduced, and charging and discharging characteristics of the battery may deteriorate. For example, a charging capacity deteriorates due to the repetition of the charging and discharging operations, such that a startup performance of an engine deteriorates, and a change period of the lead-acid battery is reduced.

In accordance with the present embodiment, the battery pack 100 includes a lithium-ion battery that well maintains its charging and discharging characteristics and whose deterioration with time is smaller in comparison with a lead-acid battery, so that the battery pack 100 may be appropriately applied to a ISG system in which a stop and a re-startup of an engine are frequently repeated. Also, because the battery pack 100 becomes more lightweight in comparison with a lead-acid battery having the same charging capacity, fuel efficiency may be improved; because the battery pack 100 realizes the same charging capacity with a smaller size in comparison with a lead-acid battery, a mounting space may be saved. The lithium-ion battery may have a rated voltage between about DC 12.6V and about 13.05V. The rated voltage refers to a voltage acceptable for a battery during a charging operation.

The battery pack 100 constructed with the principle of the present embodiment may include various types of batteries in addition to the lithium-ion battery. Here, a rated voltage of the batteries included in the battery pack 100 may be lower than an output voltage of the power generation module 110. For example, a nickel metal hydride (NiMH) battery, a nickel-cadmium battery, or the like may be applied to the battery pack 100.

At least one electric load 130 along with the power generation module 110 and the starter motor 120 may be electrically connected to the battery pack 100. The electric load 130 may vary in number and type according to types of the transporting means 10. The electric load 130 may consume the power stored in the battery pack 100, and may receive the discharging current I2 from the battery pack 100 via the first and second terminals P1 and P2. The electric load 130 may include various types of electronic devices such as a navigation device, an audio device, an illumination light, a vehicle black box, an antitheft device, or the like.

A main control unit 140 controls all the operations of the transporting means 10 to which the battery pack 100 is mounted. The main control unit 140 may be connected to the battery pack 100 via a third terminal P3, so that the main control unit 140 may exchange a control signal with the battery pack 100, may monitor a status of the battery pack 100, and may control operations of the battery pack 100. Also, the main control unit 140 may adjust an output current of the power generation module 110. The main control unit 140 may monitor the status of the battery pack 100 and thus may increase or decrease the charging current I1 of the power generation module 110. In addition, the main control unit 140 may provide the battery pack 100 with information regarding an operational status, a charging mode, or a discharging mode of the transporting means 10, so that the battery pack 100 may operate according to an operational status of the transporting means 10.

Figure 2:
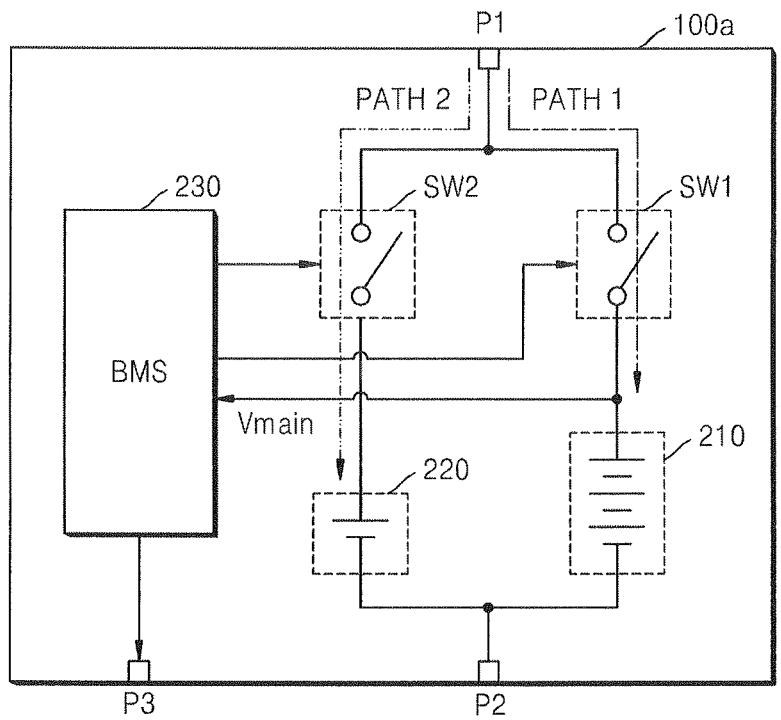
FIG. 2 is a diagram illustrating a structure of a battery pack constructed with the principle of another embodiment of the present invention.

FIG. 2 is a diagram illustrating a structure of a battery pack 100*a* constructed with the principle of another embodiment of the present invention.

The battery pack 100*a* constructed with the principle of the present embodiment includes a main battery 210, a sub-battery 220, a battery management system (BMS) 230, a first switch SW1, and a second switch SW2.

The main battery 210 and the sub-battery 220 are battery cells that are electrically connected in parallel with each other between a first terminal P1 and a second terminal P2 and are charged with electric energy by using a charging current supplied from the power generation module 110.

Figure 3:
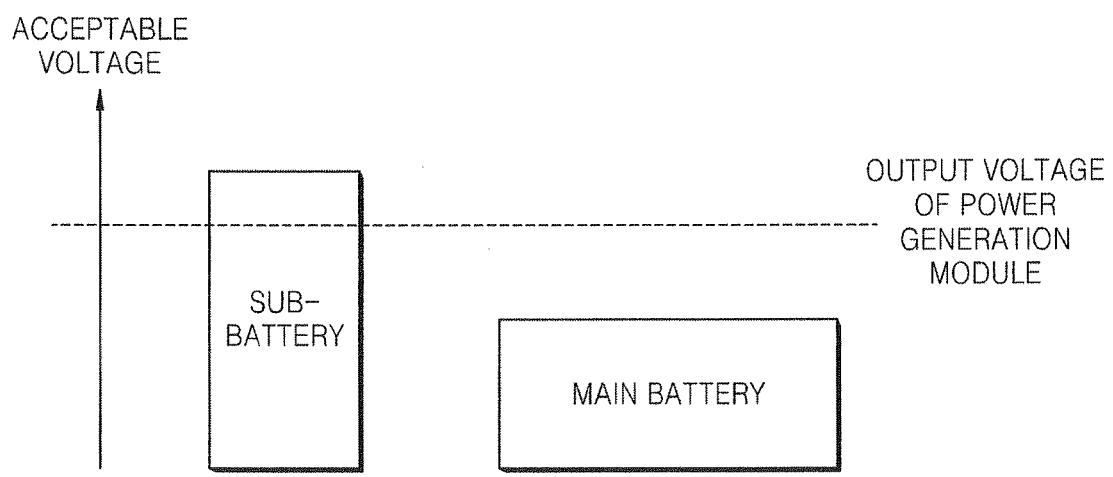
FIG. 3 is a diagram illustrating characteristics of a main battery and a sub-battery in the battery pack of FIG. 2.

FIG. 3 is a diagram illustrating characteristics of the main battery 210 and the sub-battery 220 in the battery pack 100*a* of FIG. 2.

In reference to FIG. 3, an output voltage of the power generation module 110 is higher than a maximum voltage that is acceptable for the main battery 210 during a charging operation. The sub-battery 220 is a battery cell whose acceptable voltage range during a charging operation is larger than that of the main battery 210, and may accept the output voltage of the power generation module 110. Thus, even after the main battery 210 reaches its acceptable maximum voltage during a charging operation, the sub-battery 220 may receive a charging current from the power generation module 110 and may be charged.

Also, in comparison with the sub-battery 220, the main battery 210 may have a greater charging capacity.

In accordance with the present embodiment, the main battery 210 may be a lithium-ion battery, and the sub-battery 220 may be a lead-acid battery. A lithium-ion battery has a fast response speed and thus has an excellent initial output characteristic. Accordingly, when the main battery 210 is formed as a lithium-ion battery and the sub-battery 220 is formed as the lead-acid battery, it is possible to improve an output characteristic of the battery pack 100*a* while a loss of a power supplied from the power generation module 110 is decreased.

As another example, a NiMH battery, a nickel-cadmium battery, or the like may be applied to the main battery 210.

Referring back to FIG. 2, the first switch SW1 is electrically connected in series with the main battery 210 between the first terminal P1 and the second terminal P2. Referring to FIG. 2, the first switch SW1 is electrically connected between the first terminal P1 and the main battery 210. In another example, however, the first switch SW1 may be electrically connected between the main battery 210 and the second terminal P2.

The second switch SW2 is electrically connected in series with the sub-battery 220 between the first terminal P1 and the second terminal P2. Referring to FIG. 2, the second switch SW2 is connected between the first terminal P1 and the sub-battery 220. In another example, however, the second switch SW2 may be electrically connected between the sub-battery 220 and the second terminal P2.

The first switch SW1 and the main battery 210 form a first charge path PATH1, and the second switch SW2 and the sub-battery 220 form a second charge path PATH2.

The BMS 230 controls all the operations of the battery pack 100a. For example, the BMS 230 may perform a monitoring operation of the main battery 210, a cell balancing operation of the main battery 210, a start or a stop of charging and discharging operations of the main battery 210, communication with the main control unit 140, and the like. The BMS 230 may be connected to the main control unit 140 via a third terminal P3.

The BMS 230 controls the first switch SW1 and the second switch SW2 according to a voltage Vmain of the main battery 210. According to the voltage Vmain of the main battery 210, a charging current is supplied to the main battery 210 or the sub-battery 220. In more detail, when the voltage Vmain of the main battery 210 is less than a first reference voltage, the BMS 230 sends the charging current to the main battery 210 via the first charge path PATH1; when the voltage Vmain of the main battery 210 is equal to or greater than the first reference voltage, the BMS 230 sends the charging current to the sub-battery 220 via the second charge path PATH2.

The first reference voltage corresponds to the maximum voltage that is acceptable for the main battery 210. Due to the aforementioned configuration, even when the main battery 210 reaches its limit voltage, the power supplied from the power generation module 110 may charge the sub-battery 220.

In addition, when the BMS 230 has to supply a discharging current to the starter motor 120 or the electric load 130, the BMS 230 may turn on the first switch SW1 and the second switch SW2 and then may discharge electric energy charged in the main battery 210 and the sub-battery 220. In a discharging mode, the BMS 230 discharges the electric energy from both the main battery 210 and the sub-battery 220, so that the electric energy charged in the main battery 210 and the electric energy charged in the sub-battery 220 may be used together, and the main battery 210 may have an excellent output characteristic in an early stage of a discharging operation. In the present embodiment, in response to a discharge request from the main control unit 140, the BMS 230 may operate in the discharging mode.

Figure 4:
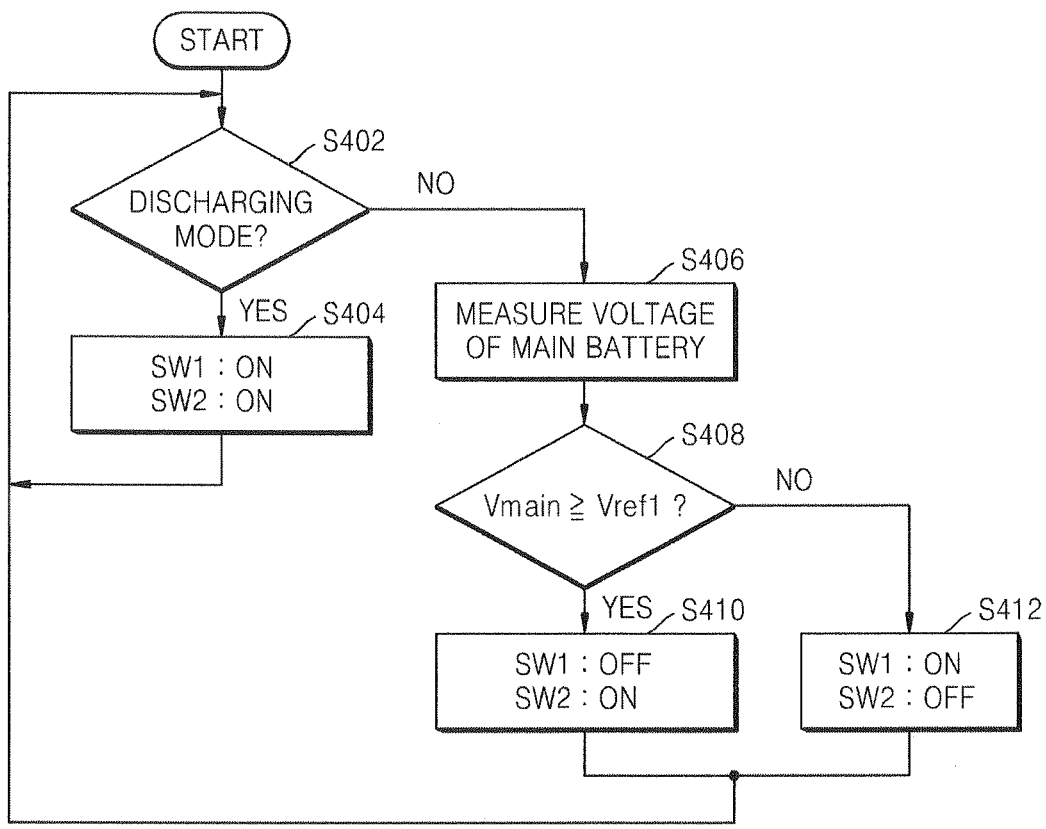
FIG. 4 is a flowchart of a method of controlling a battery pack, according to an embodiment of the present invention.

FIG. 4 is a flowchart of a method of controlling the battery pack 100a, according to an embodiment of the present invention.

When the battery pack 100a operates in the discharging mode (operation S402), the first switch SW1 and the second switch SW2 are turned on together, so that a discharging current is output from the main battery 210 and the sub-battery 220.

When the battery pack 100a is not in the discharging mode (operation S402), the BMS 230 measures a voltage Vmain of the main battery 210 (operation S406), and then determines whether the voltage Vmain of the main battery 210 is equal to or greater than a first reference voltage Vref1.

When the voltage Vmain of the main battery 210 is equal to or greater than the first reference voltage Vref1 (operation S408), the BMS 230 supplies a charging current to the sub-battery 220 by turning off the first switch SW1 and by turning on the second switch SW2 (operation S410). According to the present embodiment, in order to prevent an instant floating state, the second switch SW2 may be first turned on and then the first switch SW1 may be turned off.

When the voltage Vmain of the main battery 210 is less than the first reference voltage Vref1 (operation S408), the BMS 230 supplies the charging current to the main battery 210 by turning on the first switch SW1 and by turning off the second switch SW2 (operation S412). According to the present embodiment, in order to prevent an instant floating state, the first switch SW1 may be first turned on and then the second switch SW2 may be turned off.

Figure 5:
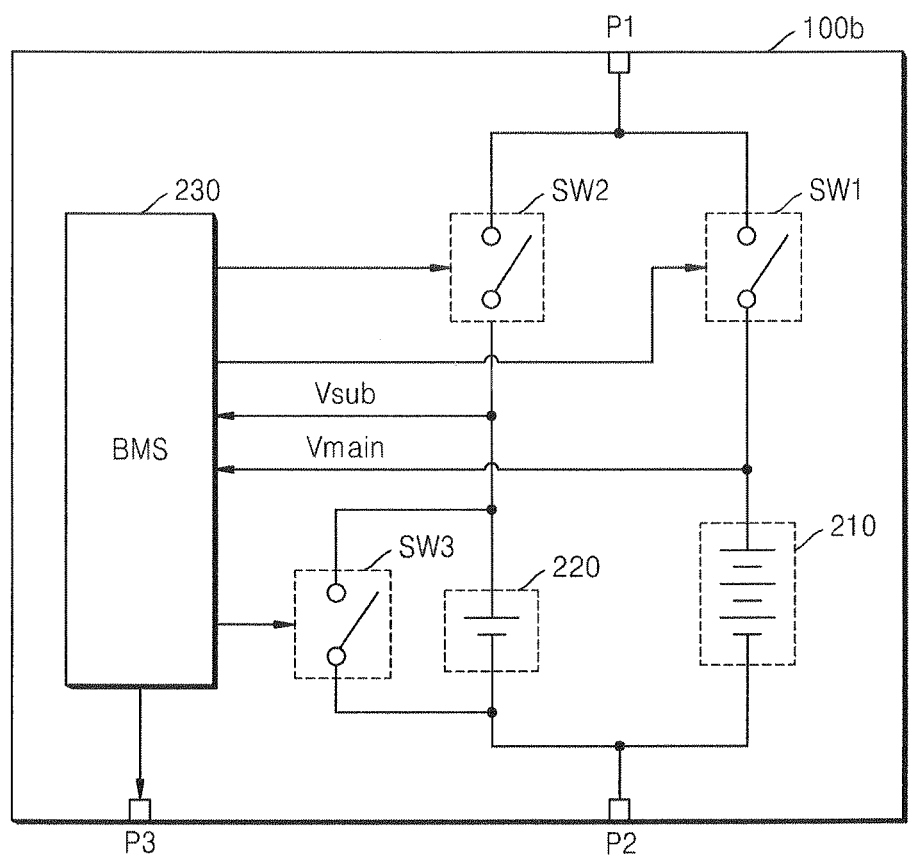
FIG. 5 is a diagram illustrating a structure of a battery pack constructed with the principle of another embodiment of the present invention.

FIG. 5 is a diagram illustrating a structure of a battery pack 100b according to another embodiment of the present invention.

The battery pack 100b constructed with the principle of the present embodiment includes a main battery 210, a sub-battery 220, a BMS 230, a first switch SW1, a second switch SW2, and a third switch SW3.

The third switch SW3 may be electrically connected between end terminals of the sub-battery 220 and may be controlled by the BMS 230. The third switch SW3 operates as a sub-battery discharging unit that discharges the sub-battery 220.

In accordance with the present embodiment, when a voltage Vsub of the sub-battery 220 is equal to or greater than a second reference voltage Vref2, the BMS 230 discharges the sub-battery 220 by turning on the third switch SW3 for a predetermined time period. The second reference voltage Vref2 may correspond to a voltage of the sub-battery 220 when the sub-battery 220 is fully charged. In accordance with the present embodiment, when the voltage Vmain of the main battery 210 reaches a first reference voltage Vref1 and the sub-battery 220 is fully charged, the sub-battery 220 is discharged so that a charge path is always ensured.

Figure 6:
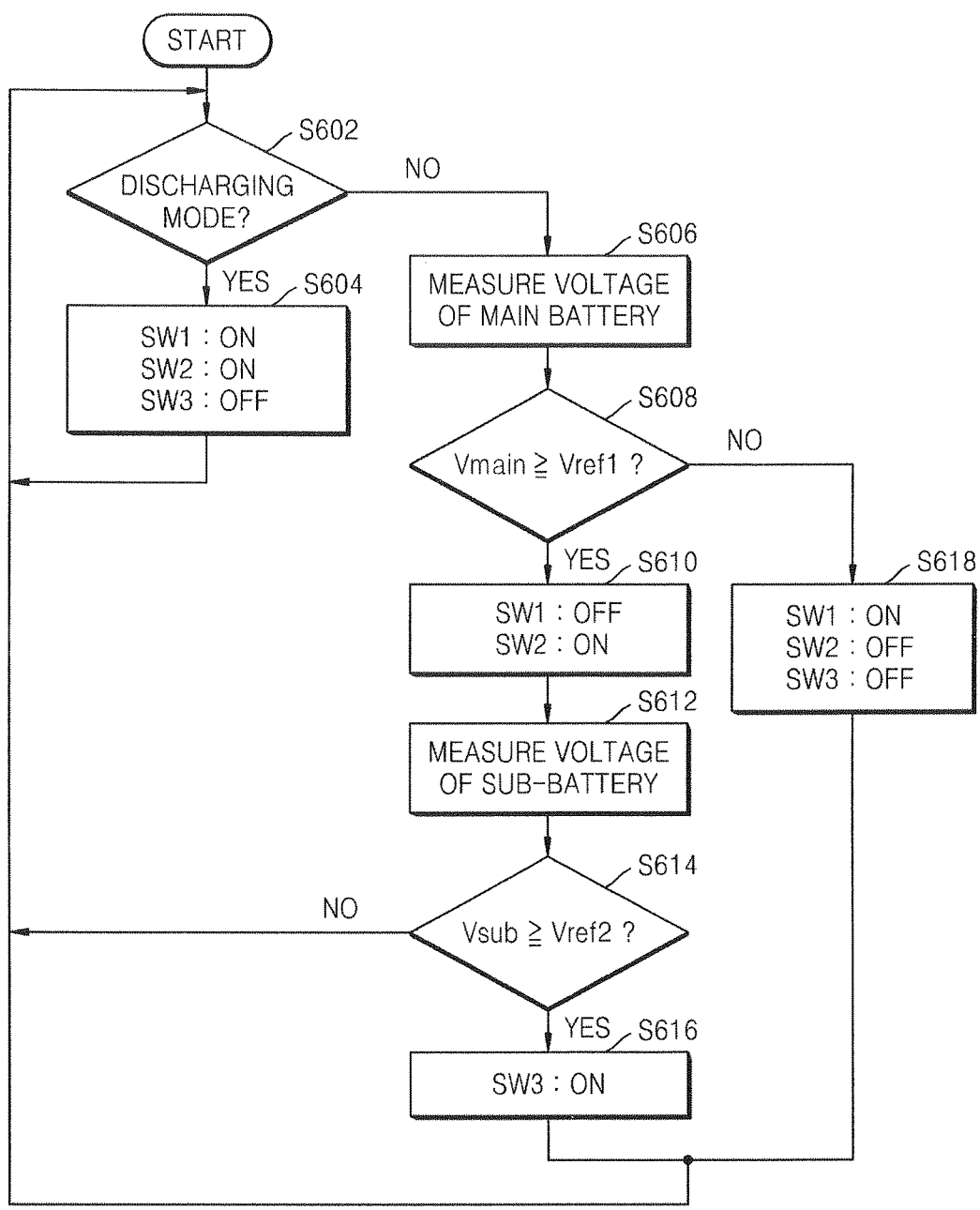
FIG. 6 is a flowchart of a method of controlling a battery pack, according to another embodiment of the present invention.

FIG. 6 is a flowchart of a method of controlling the battery pack 100b, according to another embodiment of the present invention.

When the battery pack 100b operates in a discharging mode (operation S602), the first switch SW1 and the second switch SW2 are turned on together, so that a discharging current is output from the main battery 210 and the sub-battery 220 (operation S604). Here, the third switch SW3 is turned off (operation S604).

When the battery pack 100b is not in the discharging mode (operation S602), the BMS 230 measures a voltage Vmain of the main battery 210 (operation S606), and then determines whether the voltage Vmain of the main battery 210 is equal to or greater than a first reference voltage Vref1 (operation S608).

When the voltage Vmain of the main battery 210 is equal to or greater than the first reference voltage Vref1 (operation S608), the BMS 230 supplies a charging current to the sub-battery 220 by turning off the first switch SW1 and by turning on the second switch SW2 (operation S610). In accordance with the present embodiment, in order to prevent an instant floating state, the second switch SW2 may be first turned on and then the first switch SW1 may be turned off.

Also, the BMS 230 measures a voltage Vsub of the sub-battery 220 (operation S612). When the voltage Vsub of the sub-battery 220 is equal to or greater than a second reference voltage Vref2 (operation S614), the BMS 230 discharges the sub-battery 220 by turning on the third switch SW3 during a predetermined time period.

When the voltage Vmain of the main battery 210 is less than the first reference voltage Vref1 (operation S608), the BMS 230 supplies the charging current to the main battery 210 by turning on the first switch SW1 and by turning off the second switch SW2 (operation S618). Here, the third switch SW3 is turned off (operation S618).

Figure 7:
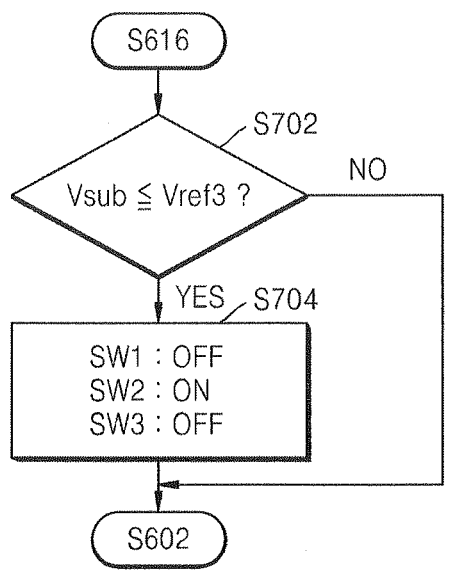
FIG. 7 is a flowchart of a method of controlling a battery pack, according to still another embodiment of the present invention.

FIG. 7 is a flowchart of a method of controlling the battery pack 100b, according to another embodiment of the present invention.

In accordance with the present embodiment, in a case where a voltage Vmain of the main battery 210 is equal to or greater than a first reference voltage Vref1 (operation S608), and a voltage Vsub of the sub-battery 220 is equal to or greater than a second reference voltage Vref2 (operation S614), the sub-battery 220 is discharged (operation S616) until an amount of electric energy capable of driving the starter motor 120 once is left in the sub-battery 220.

When the sub-battery 220 is discharged (operation S616), the BMS 230 determines whether the voltage Vsub of the sub-battery 220 is equal to or less than a third reference voltage Vref3 (operation S702). Here, the third reference voltage Vref3 corresponds to a voltage of the sub-battery 220 that is exhibited when an amount of electric energy capable of driving the starter motor 120 once is left in the sub-battery 220.

When the voltage Vsub of the sub-battery 220 is equal to or less than the third reference voltage Vref3, the BMS 230 stops discharging the sub-battery 220 by turning off the third switch SW3 while the first switch SW1 is turned off and the second switch SW2 is turned on (operation S704). By doing so, the amount of electric energy capable of driving the starter motor 120 once always remains in the sub-battery 220, so that an ISG function may be further stably realized.

In accordance with the one or more of the above embodiments of the present invention, in the battery pack for receiving a charging current from a power generation module, a loss of electric energy supplied from the power generation module to the battery pack may be decreased.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack, comprising:
a main battery storing electric energy by receiving a charging current from a power generator;
a sub-battery storing electric energy by receiving the charging current from the power generator;
a battery controller controlling the charging current from the power generator to be delivered to the sub-battery, instead of the main battery, when a voltage of the main battery is equal to or greater than a first reference voltage,
with an output voltage of the power generator being higher than a rated voltage of the main battery, and a rated voltage of the sub-battery being higher than the rated voltage of the main battery; and
a third switch electrically connected between end terminals of the sub-battery,
wherein, when a voltage of the sub-battery is less than a second reference voltage, the battery controller turns off the third switch, and when the voltage of the sub-battery is equal to or greater than the second reference voltage, the battery controller turns on the third switch, and
wherein the second reference voltage corresponds to the voltage of the sub-battery when the sub-battery is fully charged.

2. The battery pack of claim 1, further comprising:
a first switch that is serially electrically connected between the power generator and the main battery; and
a second switch that is serially electrically connected between the power generator and the sub-battery.

3. The battery pack of claim 2, wherein, when the voltage of the main battery is less than the first reference voltage, the battery controller turns on the first switch and turns off the second switch, and
when the voltage of the main battery is equal to or greater than the first reference voltage, the battery controller turns on the second switch and turns off the first switch.

4. The battery pack of claim 1, further comprising a sub-battery discharger that discharges the sub-battery when the voltage of the sub-battery is equal to or greater than the second reference voltage.

5. The battery pack of claim 1, wherein the battery pack is comprised in a vehicle or bicycle having an engine, and supplies a discharging current to a starter motor that provides a driving power for a startup of the engine of the vehicle or bicycle, and
the power generator generates electric energy from energy that is supplied from the engine.

6. The battery pack of claim 5,
when the voltage of the sub-battery is greater than a third reference voltage, the battery controller turns on the third switch, and when the voltage of the sub-battery is equal to or less than the third reference voltage, the battery controller turns off the third switch,
the third reference voltage corresponds to a voltage of the sub-battery that corresponds to a charging capacity capable of driving the starter motor once by using electric energy stored in the sub-battery, and
the third reference voltage is lower than the second reference voltage.

7. The battery pack of claim 1, wherein the battery controller discharges a discharging current from the main battery and the sub-battery in a discharging mode.

8. The battery pack of claim 7, further comprising:
a first switch that is serially electrically connected between the power generator and the main battery; and
a second switch that is serially electrically connected between the power generator and the sub-battery, and
wherein the battery controller turns on the first switch and the second switch in the discharging mode.

9. The battery pack of claim 8, further comprising a third switch that is connected between end terminals of the sub-battery, and
wherein the battery controller turns off the third switch in the discharging mode.

10. A method of controlling a battery pack comprising a main battery and a sub-battery that store electric energy by receiving a charging current from a power generator and a third switch that is electrically connected between end terminals of the sub-battery, the method comprising:
measuring a voltage of the main battery;
when the voltage of the main battery is equal to or greater than a first reference voltage, delivering a charging current from the power generator to the sub-battery, instead of the main battery, wherein an output voltage of the power generator is higher than a rated voltage of the main battery, and a rated voltage of the sub-battery is higher than the rated voltage of the main battery; and when a voltage of the sub-battery is less than a second reference voltage, turning off the third switch, and when the voltage of the sub-battery is equal to or greater than the second reference voltage, turning on the third switch, wherein the second reference voltage corresponds to the voltage of the sub-battery when the sub-battery is fully charged.

11. The method of claim 10, wherein the battery pack further comprises a first switch that is serially electrically connected between the power generator and the main battery; and a second switch that is serially electrically connected between the power generator and the sub-battery, and the method further comprises:

turning on the first switch and turning off the second switch when the voltage of the main battery is less than the first reference voltage; and turning on the second switch and turning off the first switch when the voltage of the main battery is equal to or greater than the first reference voltage.

12. The method of claim 10, further comprising discharging the sub-battery when the voltage of the sub-battery is equal to or greater than the second reference voltage.

13. The method of claim 10, wherein the battery pack is comprised in a vehicle or bicycle having an engine, and supplies a discharging current to a starter motor that provides a driving power for a startup of the engine of the vehicle or bicycle, and the power generator generates electric energy from energy that is supplied from the engine.

14. The method of claim 13, the method further comprises:

when the voltage of the sub-battery is greater than a third reference voltage, turning on the third switch; and when the voltage of the sub-battery is equal to or less than the third reference voltage, turning off the third switch, the third reference voltage corresponds to a voltage of the sub-battery that corresponds to a charging capacity capable of driving the starter motor once by using electric energy stored in the sub-battery, and the third voltage is lower than the second reference voltage.

15. The method of claim 10, further comprising discharging a discharging current from the main battery and the sub-battery in a discharging mode.

16. The method of claim 15, wherein the battery pack further comprises:

a first switch that is serially electrically connected between the power generator and the main battery; and a second switch that is serially electrically connected between the power generator and the sub-battery, and the method further comprises turning on the first switch and the second switch in the discharging mode.

17. The method of claim 16, wherein the battery pack further comprises a third switch that is electrically connected between end terminals of the sub-battery, and the method further comprises turning off the third switch in the discharging mode.

* * * * *